US011124663B2

(12) United States Patent
Claridge et al.

(10) Patent No.: US 11,124,663 B2
(45) Date of Patent: Sep. 21, 2021

(54) INK COMPOSITION AND METHOD OF PRINTING THE INK COMPOSITION

(71) Applicant: XEROX CORPORATION, Norwalk, CT (US)

(72) Inventors: Robert Claridge, Gilford (CA); Naveen Chopra, Oakville (CA); Biby Esther Abraham, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 216 days.

(21) Appl. No.: 16/368,273

(22) Filed: Mar. 28, 2019

(65) Prior Publication Data

US 2020/0308427 A1 Oct. 1, 2020

(51) Int. Cl.
| | |
|---|---|
| *C09D 11/107* | (2014.01) |
| *B41M 1/06* | (2006.01) |
| *C09D 11/037* | (2014.01) |
| *C09D 11/101* | (2014.01) |
| *C09D 11/102* | (2014.01) |
| *C09D 11/104* | (2014.01) |
| *B41M 5/00* | (2006.01) |

(52) U.S. Cl.
CPC ............ *C09D 11/107* (2013.01); *B41M 1/06* (2013.01); *B41M 5/0023* (2013.01); *C09D 11/037* (2013.01); *C09D 11/101* (2013.01); *C09D 11/102* (2013.01); *C09D 11/104* (2013.01); *B41P 2200/22* (2013.01)

(58) Field of Classification Search
None
See application file for complete search history.

(56) References Cited

U.S. PATENT DOCUMENTS

| | | | |
|---|---|---|---|
| 9,644,105 B2 | 5/2017 | Breton et al. | |
| 9,724,909 B2 | 8/2017 | Moorlag et al. | |
| 9,890,291 B2 | 2/2018 | Allen et al. | |
| 2010/0086701 A1* | 4/2010 | Iftime | C09D 11/101 427/511 |
| 2013/0278689 A1* | 10/2013 | Sowinski | C09D 11/322 347/90 |
| 2015/0175820 A1* | 6/2015 | Breton | C09D 11/102 347/20 |
| 2018/0051183 A1* | 2/2018 | Allen | C09D 11/033 |

FOREIGN PATENT DOCUMENTS

| | | |
|---|---|---|
| EP | 2886618 A1 | 6/2015 |
| EP | 3336150 A1 | 6/2018 |

OTHER PUBLICATIONS

Extended European Search Report dated Jul. 21, 2020 in corresponding European Application No. 20164051.3, 6 pages.
Soltech Ltd. Products Information Sheet (date unknown).
Soltech Ltd., "Aliphatic Urethane Acrylate" Products Information Sheet (date unknown).

(Continued)

*Primary Examiner* — Joshua D Zimmerman
(74) *Attorney, Agent, or Firm* — MH2 Technology Law Group LLP

(57) ABSTRACT

An ink composition includes at least one sulfonated polyester, at least one (meth)acrylate monomer, at least one urethane acrylate oligomer, at least one photoinitiator, at least one colorant and water.

20 Claims, 4 Drawing Sheets

(56) References Cited

OTHER PUBLICATIONS

Solmer Soltech Ltd., "Aliphatic Urethane Acrylate" SU 560 Products Information Sheet (date unknown).
Soltech Ltd., Overview Information Sheet (date unknown).
Solmer Soltech Ltd., "Aliphatic Urethane Acrylate" SWA 8006W20 Products Information Sheet (date unknown).
Chopra et al., "Aqueous Ink Composition Comprising Polyurethane," U.S. Appl. No. 15/997,760, filed Jun. 5, 2018.
Chopra et al., "Aqueous Ink Composition Comprising a Polymer Additive," U.S. Appl. No. 15/997,770, filed Jun. 5, 2018.
Chopra et al., "Ink Composition Comprising Humectant Blend," U.S. Appl. No. 15/997,781, filed Jun. 5, 2018.
Chopra et al., "Sulfonated Polyester Ink," U.S. Appl. No. 16/000,401, filed Jun. 5, 2018.

\* cited by examiner

INK COMPOSITION AND METHOD OF PRINTING THE INK COMPOSITION

FIELD OF THE DISCLOSURE

The present disclosure is directed to an ink composition and method of printing the ink by lithographic printing techniques.

BACKGROUND

Offset lithography is common for use in digital label press and packaging printing. In offset lithography (sometimes referred to as offset printing), the image may be indirectly applied to the media, such as paper or other materials, through an intermediate transfer, or blanket cylinder, whereby the image from the plate is applied first to a blanket cylinder, which then offsets, or transfers, from the blanket cylinder to the media. Typical lithographic printing techniques utilize plates that are permanently patterned, and are, therefore, useful only when printing a large number of copies of the same image, such as magazines, newspapers, and the like.

Digital offset lithographic printing has been developed as a system that uses a non-patterned re-imageable surface, which is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned re-imageable surface. The digital offset-type ink applied thereover is retained in the pockets formed by the removal of the dampening fluid. The inked surface is then brought into contact with a substrate, such as paper, plastic, metal or other material, and the ink transfers from the pockets in the dampening fluid layer to the substrate. The dampening fluid may then be removed, a new uniform layer of dampening fluid applied to the re-imageable surface, and the process repeated. An inker subsystem may be used to apply a uniform layer of digital offset-type ink over the layer of dampening fluid. The inker subsystem may use an anilox roller to meter the ink onto one or more ink forming rollers that are in contact with the re-imageable surface.

Digital offset lithographic printing systems use offset-type inks that are specifically designed and optimized to be compatible with the materials the ink is in contact with, including the re-imageable surface and the dampening solution as well as with the various subsystems used during the printing process to enable high quality digital printing at high speed. Digital offset printing inks differ from other types of conventional inks because they must meet demanding rheological requirements imposed by the lithographic printing process while being compatible with system component materials and meeting the functional requirements of subsystem components, including wetting and transfer. Accordingly, digital offset inks require a specific range of viscosity, tack and tack stability to afford sufficient and predictable ink cohesion to enable good transfer properties in and among the various subsystems. Further, in some applications, such as food packaging, UV ink components can be limited so as to provide inks that are food safe.

There remains a need for digital advanced lithography imaging for inks that are suitable for food-grade printing, including 'food safe' compositions, such as water-based formulations. Waterborne DALI ink compositions achieving a very water-robust film have not previously been demonstrated without baking at high temperature. The requirement of baking limits the substrate latitude of the final product. Thus, it would be a step forward in the art to enhance the water and chemical robustness of aqueous DALI ink while retaining good transfer properties at a low cure temperature.

SUMMARY

An embodiment of the present disclosure is directed to an ink composition. The ink composition comprises: at least one sulfonated polyester, at least one (meth)acrylate monomer, at least one urethane acrylate oligomer, at least one photoinitiator, at least one colorant and water.

Another embodiment of the present disclosure is directed to a method for variable lithographic printing. The method comprises applying a dampening fluid to an imaging member surface. A latent image is formed by removing the dampening fluid from selective locations on the imaging member surface to form hydrophobic non-image areas and hydrophilic image areas. The latent image is developed by applying an ink composition to the hydrophilic image areas, thereby forming an ink image. The ink image is transferred to a printable substrate. The ink composition comprises at least one sulfonated polyester, at least one (meth)acrylate monomer, at least one urethane acrylate oligomer, at least one photoinitiator, at least one colorant and water.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
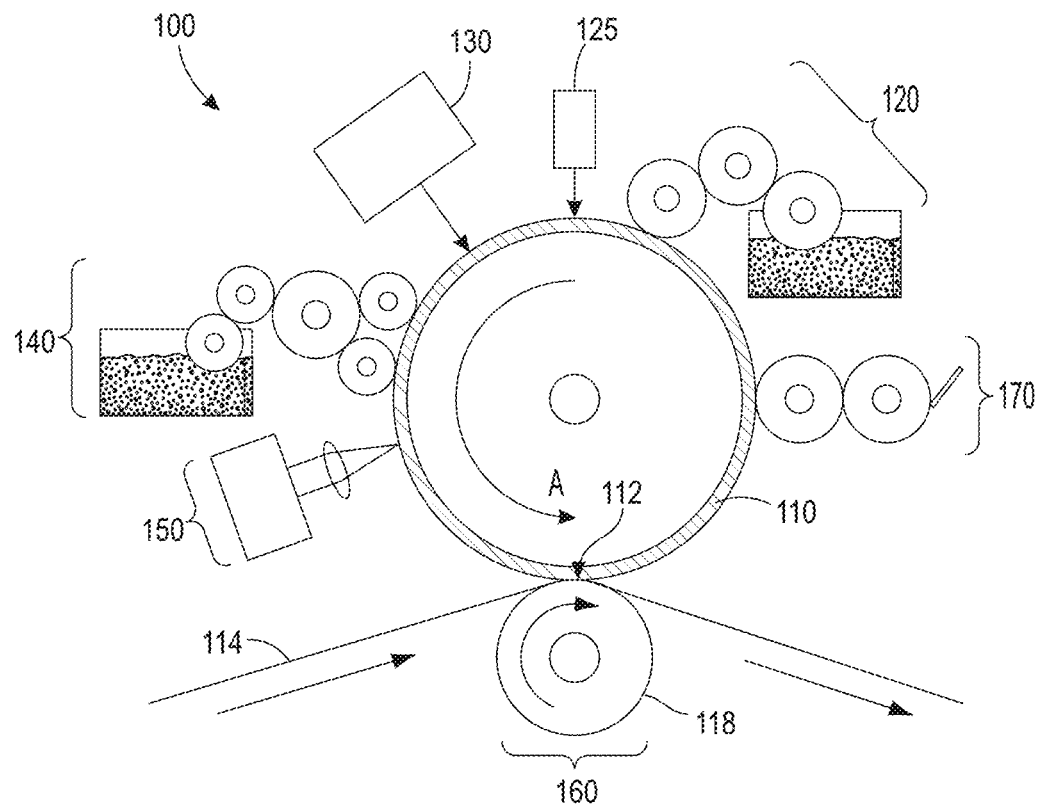
FIG. 1 illustrates a schematic view of a system for variable lithography that employs the ink compositions described herein, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration, specific exemplary embodiments in which the present teachings may be practiced. The following description is, therefore, merely exemplary.

Ink Compositions

The present disclosure relates to ink compositions that employ water-dissipatable sulfopolyester polymers and waterborne UV curable acrylates, including urethane acrylates, for a polymer matrix. This combination of ingredients can have one or more advantages, such as good ink transfer from a central imaging cylinder and robustness of the final print image. In using urethane acrylate materials with high molecular weights (e.g., >1000 kDa), the migration of the UV-curable components can be reduced to acceptable levels, thereby rendering them safe for food product labels and packaging.

The ink compositions of the present disclosure can be cured using ultraviolet ("UV") radiation. The UV radiation can be generated at desired wavelength ranges using, for example, light emitting diodes ("LEDs"). Examples of suitable wavelengths include ranges from 300 nm to 400 nm, or 350 nm to 400 nm, although any wavelengths that can effectively cure the ink can be employed. As is well known in the art, UV curing is a process in which a coating/ink is irradiated with UV light in order to initiate a photochemical reaction that creates a 3D network of crosslinked polymers. This process can have advantages, such as high cure speeds, reduced flaws due to long drying times and/or increased robustness of the cured ink.

An embodiment of the present disclosure is directed to a UV curable ink composition. The ink composition comprises at least one sulfonated polyester; at least one (meth) acrylate monomer; at least one urethane acrylate oligomer; at least one photoinitiator; at least one colorant; and water.

Sulfopolyester

In embodiments, the sulfonated polyesters of the present disclosure can be prepared from the polymerization reaction of at least one diacid monomer or at least one diester monomer, and at least one alkali sulfonated difunctional monomer. In embodiments, the sulfonated polyesters of the present disclosure can be prepared from the reaction of at least one diacid monomer or at least one diester monomer, at least one alkali sulfonated difunctional monomer, and at least one diol monomer.

The term "diacid" used herein, refers to compounds containing dicarboxylic acids or the source compounds of the dicarboxylic acids derived from (i.e., acid anhydrides or esters of the diacid). Examples of diacid include dicarboxylic acids of terephthalic acid, phthalic acid, isophthalic acid, fumaric acid, maleic acid, succinic acid, itaconic acid, succinic acid, succinic anhydride, dodecenylsuccinic acid, dodecenylsuccinic anhydride (DDSA), glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The term "diesters" used herein, refers to esters of the diacids used herein, where the alkyl groups of the diesters (the carbon group of the diol monomer) may contain from 2 to about 10 carbon atoms, which may be branched or unbranched.

The diacid or diester used in the preparation of the sulfonated polyester may be included in an amount of from about 40 to about 48 mole percent, from about 42 to about 47 mole percent, or from about 43 to about 45 mole percent. Unless otherwise stated, as used herein mole (or mol) percent refers to the percentage of moles of sulfonated monomer present in the final sulfonated polyester resin and can be calculated, for example, as (moles DMSIP (Dimethyl-5-Sulfoisophthalate Sodium Salt) charged/(total moles charged less excess moles glycol or other excess diols)×100 percent).

Alkali sulfonated difunctional monomer examples, wherein the alkali is lithium, sodium, or potassium, and in particular embodiments wherein the alkali is sodium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, mixtures thereof, and the like. In embodiments, the alkali sulfonated difunctional monomer used in the preparation of the sulfonated polyester may be included in an amount of from about 3.0 to about 15 mole percent, from about 4 to about 10 mole percent, from about 5 to about 9 mole percent, or from about 6 to about 8 mole percent, or about 7.5 mole percent.

Previous experiments have been carried out in the prior art using sulfonated polyester with 3.5 wt % sulfonation. Beyond a certain concentration at this level of sulfonation, there is a solubility limit, and the particle domains are in the 100 nm regime, which may result in a reduced viscosity. In this disclosure, while lower sulfonation levels are possible, sulfopolyesters with a higher % sulfonation (such as 7.5% or greater) are contemplated to enable higher solids loading and smaller particle domains, such as, for example, 50 nm or less, which result in an increased viscosity of the finished ink.

Examples of diols utilized in generating the sulfonated polyester include, but are not limited to, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The diol used in the preparation of the sulfonated polyester may be employed in an amount of from about 40 to about 48 mole percent, from about 42 to about 47 mole percent, or from about 43 to about 45 mole percent. In embodiments, an extra amount (or excess amount) of diol may be used to drive the reaction to completion, where the excess amount of diol is then distilled off or removed.

In embodiments, after polymerization, the resulting sulfonated polyesters may comprise an aryl unit, a sulfonated unit, and a aliphatic unit having the following formulae:

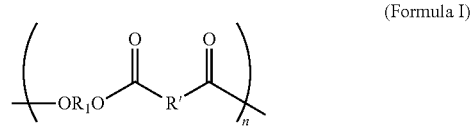

(Formula I)

terephthalate-diol unit

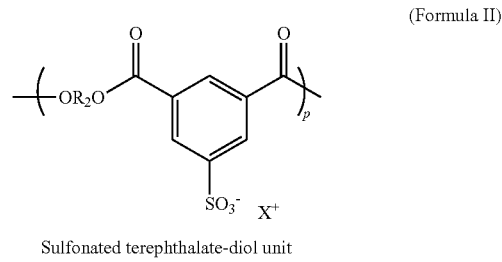

(Formula II)

Sulfonated terephthalate-diol unit

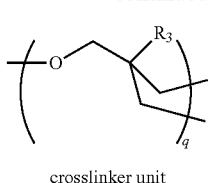

crosslinker unit (Formula III)

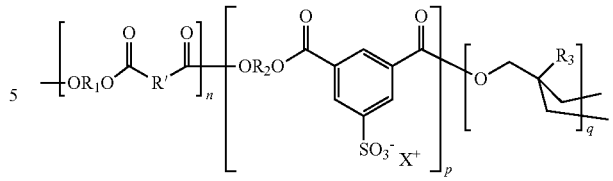

where each $R_1$ and each $R_2$ may be independently an alkylene of, for example, from 2 to about 25 carbon atoms such as ethylene, propylene, butylene, oxyalkylene diethyleneoxide, and the like; each $R_3$ may be independently an alkyl group of, for example, from 1 to 15 carbon atoms, branched or unbranched, such as, methyl, ethyl, propyl, isopropyl, butyl, and the like; each R' may be independently an arylene of, for example, from about 6 to about 36 carbon atoms, such as a benzylene, bisphenylene, bis(alkyloxy) bisphenolene, and the like; each $X^+$ may be independently $Na^+$, $Li+$, $K+$, and the like; and each n, each p and each q represent the number of randomly repeating segments, each of which may be independently from about 10 to about 100,000. In embodiments, n is from about 80 to about 95 mol percent, from about 84 to about 90 mol percent, or from about 86 to about 90 mol percent. In embodiments, p is from about 5 to about 15 mol percent, from about 6 to about 12 mol percent, or from about 7.5 to about 10 mol percent. In embodiments, q is from about 0.1 to about 4 mol percent, 0.1 to about 2.5 mol percent, from about 0.2 to about 1.5 mol percent. p represents the amount of sulfonation in the sulfonated polyester. q represents the amount of crosslinker in the sulfonated polyester. In an embodiment where the terephthalate diol unit, the sulphonated terephthalate diol unit and the crosslinker diol unit are the only polymer units, then n is 100−(p+q). Other optional units may also be included, such as a branching agent unit as described below.

The sulfonated polyesters may include a random combination of at least one optionally repeating aryl unit, at least one optionally repeating sulfonated unit, at least one optionally repeating aliphatic unit.

In embodiments, the sulfonated polyesters may have the following general structure, or random copolymers thereof in which the n and p segments are separate:

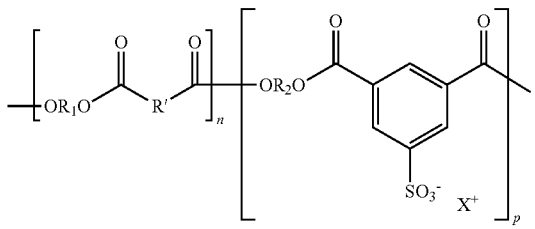

wherein $R_1$, $R_2$, R', X, n and p are the same as defined herein above for Formulae I, II and III.

In embodiments, the sulfonated polyester may have the following general structure:

wherein $R_1$, $R_2$, $R_3$, R', X, n, p, and q are the same as defined herein above for Formulae I, II and III.

Examples of the sulfonated polyesters further include those disclosed in U.S. Pat. No. 7,312,011 which is incorporated herein by reference in its entirety.

In embodiments, the sulfonated polyesters are amorphous. In embodiments, the amorphous sulfonated polyesters can be an acid or a salt of a random sulfonated polyester of poly(1,2-propylene-5-sulfoisophthalate), poly(neopentylene-5-sulfoisophthalate), poly(diethylene-5-sulfoisophthalate), copoly(1,2-propylene-5-sulfoisophthalate)-copoly-(1, 2-propylene-terephthalate phthalate), copoly(1,2-propylene-diethylene-5-sulfoisophthalate)-copoly-(1,2-propylene-diethylene-terephthalate phthalate), copoly(ethylene-neopentylene-5-sulfoisophthalate)-copoly-(ethylene-neopentylene-terephthalate-phthalate), copoly(propoxylated bisphenol A)-copoly-(propoxylated bisphenol A-5-sulfoisophthalate), copoly(ethylene-terephthalate)-copoly-(ethylene-5-sulfoisophthalate), copoly(propylene-terephthalate)-copoly-(propylene-5-sulfoisophthalate), copoly(diethylene-terephthalate)-copoly-(diethylene-5-sulfoisophthalate), copoly(propylene-diethylene-terephthalate)-copoly-(propylenediethylene-5-sulfoisophthalate), copoly(propylene-butylene-terephthalate)copoly(propylene-butylene-5-sulfo-isophthalate), copoly(propoxylated bisphenol-A-fumarate)-copoly(propoxylated bisphenol A-5-sulfoisophthalate), copoly(ethoxylated bisphenol-A-fumarate)-copoly(ethoxylated bisphenol-A-5-sulfoisophthalate), copoly(ethoxylated bisphenol-A-maleate)-copoly(ethoxylated bisphenol-A-5-sulfo-isophthalate), copoly(propylene-diethylene terephthalate)-copoly(propylene-5-sulfoisophthalate), copoly(neopentyl-terephthalate)-copoly-(neopentyl-5-sulfoisophthalate), and the like, as well as mixtures thereof.

The salts of the random amorphous sulfonated polyesters of the present embodiments may include salts of alkali metals, such as sodium, lithium, and potassium; salts of alkaline earth metals, such as beryllium, magnesium, calcium, and barium; metal salts of transition metals, such as vanadium, iron, cobalt, copper; metal salts, such as aluminum salts, and the like, as well as mixtures thereof.

In embodiments, the sulfonated polyester matrix is a branched polymer. In embodiments, the sulfonated polyester matrix is a linear polymer. The selection of branched or linear polymer may depend on, inter alia, the downstream application of the composite product. Linear polymers can be used to create strands of fibers or form a strong mesh-like structure. Branched polymers may be useful to confer thermoplastic properties on the resultant composite material.

The linear sulfonated polyester are generally prepared by the polycondensation of an organic diol and a diacid or diester, at least one of which is sulfonated or a sulfonated difunctional monomer being included in the reaction, and a polycondensation catalyst. For the branched sulfonated polyester, the same materials may be used, with the further inclusion of a branching agent such as a multivalent polyacid or polyol. Branching agents for use in forming the branched sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the sulfonated polyester.

The polycondensation may be carried out under acidic conditions. The polycondensation may be carried out in the presence of a catalyst. In embodiments, the catalyst employed in the polyesterification reaction is tin-based. Such catalysts may be based on tin (II) or tin (IV) oxidation states. In embodiments, the tin-based catalyst are mono-, di-, or tetraalkyl tin-based. Examples of tin-based catalyst include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof. In embodiments, monoalkyl tin compounds may further comprise oxide and/or hydroxide groups attached to the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the sulfonated polyesters herein. The amount of catalysts used herein may be from about 0.01 mole percent to about 5 mole percent based on the starting amount of diacid or diester used to generate the sulfonated polyesters.

The sulfonated polyesters suitable for use in the present disclosure may have a glass transition (Tg) temperature of from about 45° C. to about 95° C., or from about 52° C. to about 70° C., as measured by a Differential Scanning calorimeter. The sulfonated polyesters may have a number average molecular weight of from about 2,000 g per mole to about 150,000 g per mole, from about 3,000 g per mole to about 50,000 g per mole, or from about 6,000 g per mole to about 15,000 g per mole, as measured by the Gel Permeation Chromatograph. The sulfonated polyesters may have a weight average molecular weight of from about 3,000 g per mole to about 300,000 g per mole, from about 8,000 g per mole to about 90,000 g per mole, or from about 10,000 g per mole to about 60,000 g per mole, as measured by the Gel Permeation Chromatograph. The sulfonated polyesters may have a polydispersity of from about 1.6 to about 100, from about 2.0 to about 50, or from about 5.0 to about 30, as calculated by the ratio of the weight average to number average molecular weight.

In embodiments, the sulfonated polyester has a particle size in a range of, for example, from about 1 nanometer (nm) to about 55 nm, from about 5 to about 45 nm, or from about 5 to about 30 nm. A particle size of less than 5 nm may be useful for reinforcement of polymer matrices without disturbing transparency and other properties of coatings.

In embodiments, the sulfonated polyester has a particle size of from about 5 nanometers to about 55 nanometers. In further embodiments, the polyester has a particle size of from about 10 nanometers to about 15 nanometers. As used herein, references to "particle size" will generally refer to $D_{50}$ mass-median-diameter (MMD) or the log-normal distribution mass median diameter. The MMD is considered to be the average particle diameter by mass.

In embodiments, there are provided methods comprising heating a sulfonated polyester resin in water, thereby forming an emulsion of composite particles comprising a sulfonated polyester. In embodiments, heating is conducted at a temperature of from about 65° C. to about 95° C.

In certain embodiments, a method herein comprises heating a sulfonated polyester resin in water, wherein the sodium sulfonated polyester has a degree of sulfonation of from about 3.0 weight percent to about 15 weight percent, from about 6 to about 12 mol percent, or from about 7.5 to about 10 mol percent; and forming an emulsion of particles comprising the sulfonated polyester. In embodiments, the method further comprises combining the polyester particles with water, an optional co-solvent, and a polyurethane dispersion to form an aqueous ink composition.

The ink of the present disclosure may contain from about 10 to about 60 weight percent, from about 15 to about 50 weight percent, or from about 20 to about 40 weight percent, or from about 25 to about 35 weight percent, of the sulfonated polyester based on the total weight of the ink.

(Meth)acrylate Monomer

The curable components of the ink composition comprise (meth)acrylate monomers, urethane (meth)acrylate oligomers and at least one photoinitiator. The monomers/oligomers are employed to control the viscosity of the ink, as well as the hardness/softness of the cured coating. The urethane (meth)acylate oligomers comprise reactive resins that enhance the robustness of the cured ink. When exposed to UV light, the photoinitiator(s) begin the radical reaction that crosslinks the monomers/oligomers into a 3D polymer network resulting in a robust ink image.

The at least one (meth)acrylate monomer is UV curable. In an embodiment, the (meth)acrylate monomer comprises at least one monomer selected from the group consisting of difunctional (meth)acrylates and multifunctional (meth)acrylates. In an embodiment, the at least one (meth)acrylate monomer is selected from the group consisting of alkyl acrylates and alkoxy acrylates. For example, the at least one (meth)acrylate monomer can be selected from the group consisting of ethoxylated acrylates, such as those having 5 to 15 ethoxy groups, polyethylene glycol diacrylates, propoxylated acrylates, trimethylpropane triacrylate, ethoxylated trimethylpropane triacrylate and propoxylated trimethylpropane triacrylate.

Certain acrylate monomers, for example, polyethylene glycol diacrylates (PEGDA), can double as a humectant and replace other humectants, such as sulfolane/diethylene glycol. Alternatively, if desired, a separate humectant can be employed in addition to the acrylate monomer. The humectant increases the worktime of the aqueous ink and ensures the ink does not dry on the anilox roll.

Urethane Acrylate Oligomer

The at least one urethane acrylate oligomer can be, for example, an aliphatic urethane acrylate oligomer or aromatic urethane acrylate oligomer. The urethane acrylate oligomers of the present disclosure can have any suitable functionality, such as, for example, a functionality ranging from 1 to 10, or 2 to 8, or 3 to 6. In an embodiment, the urethane acrylate oligomers are multifunctional oligomers having functionalities of 3 or more.

If desired, 2, 3, 4 or more different urethane acrylate oligomers can be employed. Using a plurality of urethane acrylate oligomers can allow additional degrees of freedom for adjusting the viscosity and tack for the ink composition. Another reason for using a plurality of urethane acrylate oligomers is that that acrylates with higher order functionality, although capable of producing more robust films, may also result in harder/more brittle films. Employing a second oligomer with lower functionality, such as a trifunctional urethane acrylate oligomer, in combination with higher functionality oligomers can allow for a robust film while still providing a desired degree of flexibility of the film. Thus, a plurality of multifunctional aliphatic urethane acrylate oligomers having different functionalities can be employed. For example, the at least one urethane acrylate oligomer can include both a trifunctional urethane acrylate oligomer and another multifunctional urethane acrylate oligomer having a functionality of 4 or more, such as 4 to 8, or 5 to 7 or 6.

The waterborne urethane acrylate oligomers possess a high viscosity and tack which allows for the retention of transfer properties. In an embodiment, the at least one urethane acrylate oligomer comprises a first urethane acrylate oligomer having a first viscosity and a second urethane acrylate oligomer having a second viscosity, where the first viscosity is lower than the second viscosity. For example, the first viscosity can range from about 1000 cP to about 5500 cP at 60° C., such as about 2000 cP to about 4500 cP at 60° C. The second viscosity can range from about 6000 cP to about 20,000 cP at 60° C., such as about 7000 cP to about 12,000 cP at 60° C. It has been found that employing at least one urethane acrylate oligomer having a high viscosity, such as over 6000 cP at 60° C., or over 7000 cP at 60° C., can improve the transfer of the ink during printing.

The urethane acrylate oligomers can be chosen to have a high molecular weight so as to reduce the migration of residual oligomer. One or more of the urethane acrylate oligomers has a weight average molecular weight ranging from about 2000 to about 5000, such as about 2500 to about 3500. Oligomers with molecular weights outside of these ranges can also be employed.

Commercially available urethane acrylate oligomers include Solmer acrylates (SU 560 and SWA 8006 W20), available from Soltech LTD. They are multifunuctional aliphatic urethane acrylates with a high viscosity and molecular weight (e.g., 3000 or more daltons). The materials are highly miscible in the waterborne DALI ink formulations and exhibit a new benchmark in water and chemical resistance and impart excellent adhesion properties to the dried ink film. Other possible grades of SOLMER™ aliphatic urethane acrylates that may be suitable for this ink include those that are multifunctional and/or possess a high viscosity and molecular weight such as SU 550, SU 55A and SW 5200. Other commercially available options include EBECRYL™ 4587, EBECRYL 4666 and EBECRYL 5129, all available from Allnex Inc., of Alpharetta, Ga.

Photoinitiator

Any photoinitiator suitable for UV curing can be employed in the ink compositions of the present disclosure. Examples include phosphine oxide photoinitiators. Phosphine oxide photoinitiators are long wavelength UV absorbers. They are particularly suited for LED light and highly pigmented coatings, and are also suited for depth cure due to a high degree of penetration into the coating. An example of a suitable phosphine oxide photoinitiator is Phenylbis(2, 4,6-trimethylbenzoyl)phosphine oxide, which is commercially available as IRGACURE™ 819 or IRGACURE 819 DW (IRGACURE 819 DW is a stable emulsion of IRGACURE 819 in water that is suitable for the aqueous systems of the present disclosure), from BASF of Florham Park, N.J. Other suitable phosphine oxides include Diphenyl-(2,4,6, Trimethylbenzoyl)phosphine oxide (TPO) and Ethyl (2,4,6-trimethylbenzoyl)phenylphosphinate (TPO-L). Examples of commercially available phosphine oxide photoinitiators include LUCIRIN™ TPO and LUCIRIN TPO-L from BASF; GENOCURE™ TPO and GENOCURE TPO-L from Rahn AG of Zurich, Switzerland; and OMNIRAD™ TPO, OMNIRAD TPO-L and OMNIRAD 819, from IGM Resins of Charlotte, N.C. Combinations of any of the above phosphine oxides can be employed.

The amount of photoinitiator employed in the ink compositions can be any suitable amount that provide for the desired polymerization so as to provide adequate curing. As an example, the amount of photoinitiator can range from about 0.5 wt. % to about 10 wt. %, such as about 1.5 wt. % to about 7.5 wt. %, or about 3 wt. % to about 6 wt. %, based on the total weight of the wet ink composition.

Colorants

In an embodiment, the colorants employed in the inks of the present disclosure include one or more pigments. The pigments can be chosen to provide an ink of any desired color, such as to achieve CMYK coloured inks, as well as specialty colours. The pigments may be chosen so as to be capable of being dispersed in the ink carrier and are compatible with the other ink components.

Optional Ingredients

Any other ingredients suitable for use in digital offset printing inks can also optionally be included in the compositions of the present disclosure. One of ordinary skill in the art would readily be able to determine other ingredients that can be employed.

One example of an optional ingredient is a water dispersible polymer, such as a polyurethane dispersion (PUD), an acrylonitrile butadiene styrene latex, styrene acrylic latex, polyisoprene latex or other water dispersible polymer. The water dispersible additives can be used to achieve improved film formation prior to curing.

As used herein, the term "PUD" means the polyurethanes dispersions, which are different than the urethane acrylate oligomers discussed above. As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

The polyurethane dispersion of the present disclosure can be prepared from the reaction product of: (a) a urethane prepolymer, the urethane prepolymer being a catalyzed reaction product of: (i) a polyol; (ii) a polyisocyanate; and (iii) an internal surfactant; (b) a neutralizing agent; and (c) a chain extender.

Polyurethane dispersions (PUDs) have been employed as carriers in aqueous ink jet inks, for example, U.S. Pat. No. 5,700,851, and aqueous writing inks, for example, U.S. Pat. No. 5,637,638, which are both hereby incorporated by reference. Commercial examples of PUD can include, for example, U410 and U615 obtained from Alberdingk; U355 obtained from Bayhydrol; U2757, UH420, UH2558, UXP2698, UXP2755, UA2586 XP, UHXP2648 and UH2952/1 obtained from Covestro; and DL1380 and DL1537 obtained from Impranil, or obtained from Covestro.

The ink compositions of the present disclosure may comprise any suitable amount, such as from about 2 to about 40 weight percent, from about 5 to about 30 weight percent, or from about 10 to about 20 weight percent, of the water dispersible polymers, based on the total weight of the ink.

Other optional ingredients can also be employed, including wetting agents that can aid in the wetting of the blanket/substrate. A commercial example of such wetting agent is Dynwet 800, available from BYK Additives & Instruments of Wesel, Germany.

Carrier

The inks of the present disclosure are aqueous based. Water is present in the ink composition in any suitable amount, such as from about 10% to about 50% by weight, such as about 10% to about 30%, or about 15% to about 25%, based upon the total weight of the ink composition.

The ink compositions of the present disclosure have any viscosity that, for example, is suitable for offset printing. It is advantageous to ensure a high degree of ink transfer from the anilox roller to the blanket such that the ink has relatively high viscosity within a temperature range of, in embodiments, from about 18 to about 35° C., such as from about 18 to about 30° C., such as about 25° C., at shear rates corresponding to the equivalent angular frequencies from about 0.5 to about 2 rad/s such as about 1 rad/s. In embodiments, the ink composition has a complex viscosity of from about 100,000 to about 2,000,000 centipoise at a temperature of 25° C. and an angular frequency of 1 rad/s. The complex viscosity of the ink can be measured using a DHR-2 rheometer from TA Instruments. In an embodiment, the inks are thixotropic and exhibit shear thinning.

Methods of Making the Compositions

The ink compositions can be prepared by any desired or suitable method. For example, the ingredients described herein can be mixed together in any suitable order using any suitable mixing techniques. Suitable techniques for mixing the inks are well known in the art.

Methods of Printing

The present disclosure is also directed to a printing method. The method is carried out on a system for variable lithography that employs the ink compositions described herein.

As shown in FIG. 1, an exemplary system 100 may include an imaging member 110. The imaging member 110 in the embodiment shown in FIG. 1 is a drum, but this exemplary depiction should not be interpreted so as to exclude embodiments wherein the imaging member 110 includes a plate, belt, or other known or later developed configuration. The imaging member has a reimageable surface that may be formed of materials that provide the desired properties for forming and releasing an ink image. Example materials include silicones such as polydimethylsiloxane (PDMS), fluorosilicones, and/or fluoropolymer elastomers such as VITON®. Other suitable materials may also be employed. In an embodiment, the reimageable surface may be formed of a relatively thin layer over a mounting layer, a thickness of the relatively thin layer being selected to balance printing or marking performance, durability and manufacturability.

The imaging member 110 is used to apply an ink image to an image receiving printable substrate 114 at a transfer nip 112. The transfer nip 112 is formed by an impression roller 118, as part of an image transfer mechanism 160, exerting pressure in the direction of the imaging member 110. Image receiving printable substrate 114 can be any suitable medium onto which an ink image can be transferred, including, for example, paper, plastic, metal or composite sheet film. In an embodiment, the printable substrate is a label, such as a food label or other product label. The exemplary system 100 may be used for producing images on a wide variety of image receiving printable substrates. There is wide latitude of marking (printing) materials that may be used, including marking materials with pigment loading greater than 50% by weight. This disclosure will use the term ink to refer to a broad range of printing or marking materials to include those which are commonly understood to be inks, pigments, and other materials that may be applied by the exemplary system 100 to produce an output image on the image receiving printable substrate 114.

The exemplary system 100 includes a dampening fluid system 120 generally comprising a series of rollers, which may be considered as dampening rollers or a dampening unit, for uniformly wetting the reimageable surface of the imaging member 110 with dampening fluid. A purpose of the dampening fluid system 120 is to deliver a layer of dampening fluid, generally having a uniform and controlled thickness, to the reimageable surface of the imaging member 110. Suitable dampening fluids are well known in the art and may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may optionally be added to the dampening fluids as well. Alternatively, other suitable dampening fluids may be used to enhance the performance of ink based digital lithography systems. Exemplary dampening fluids include water, NOVEC® 7600 (1,1,1,2,3,3-Hexafluoro-4-(1,1,2,3,3,3-hexafluoropropoxy)pentane and has CAS#870778-34-0.), and D4 (octamethylcyclotetrasiloxane).

Once the dampening fluid is metered onto the reimageable surface of the imaging member 110, a thickness of the dampening fluid may be measured using a sensor 125. Sensor 125 may provide feedback to control the metering of the dampening fluid onto the reimageable surface of the imaging member 110 by the dampening fluid system 120.

After dampening fluid is applied to the reimageable surface of the imaging member 110, an optical patterning subsystem 130 may be used to selectively form a latent image in the uniform dampening fluid layer. Any suitable patterning techniques suitable for imaging the dampening fluid layer may be employed. One suitable example patterning process employs a laser to image the dampening fluid. The mechanics at work in the patterning process undertaken by the optical patterning subsystem 130 of the exemplary system 100 are known to those in the art. Briefly, the application of optical patterning energy from the optical patterning subsystem 130 results in selective removal of portions of the layer of dampening fluid to form hydrophobic non-image areas and hydrophilic image areas.

Following patterning of the dampening fluid layer on image member 110 by the optical patterning subsystem 130, the patterned layer is presented to an inker subsystem 140. The inker subsystem 140 is used to apply a uniform layer of ink over the layer of patterned dampening fluid. Any of the inks described herein can be applied by the inker subsystem 140. The inker subsystem 140 may use an anilox roller to meter the offset lithographic inks of the present disclosure onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the hydrophilic imaged portions of the reimageable surface at which the dampening fluid has been removed (sometimes referred to herein as "pockets"), while ink will not adhere to portions of the reimageable surface on which dampening fluid remains.

Any suitable means can be employed to modify the cohesiveness and viscosity of the ink residing on the reimageable surface of the imaging member 110. Curing mechanisms, for example, may include optical or photo curing, cooling, heat curing, drying, or various forms of chemical curing. One such optional mechanism may involve the use of a rheology (complex viscoelastic modulus) control subsystem 150. The rheology control system 150 may form a partial crosslinking core of the ink on the reimageable surface to, for example, increase ink cohesive strength relative to the reimageable surface layer.

The ink is transferred from the reimageable surface of the imaging member 110 to an image receiving printable substrate 114 using a transfer subsystem 160. The transfer occurs as the printable substrate 114 is passed through a nip 112 between the imaging member 110 and an impression roller 118 such that the ink within the pockets of the reimageable surface of the imaging member 110 is brought into physical contact with the printable substrate 114. The adhesion of the ink may be modified as the viscosity of the ink changes, such as by partial UV curing using rheology control system 150. The modified adhesion of the ink causes the ink to adhere to the printable substrate 114 and to separate from the reimageable surface of the imaging member 110.

In an embodiment, control of the temperature and pressure conditions at the transfer nip 112 can aid in transfer of the ink image. As an example, transfer efficiencies for the ink from the reimageable surface of the imaging member 110 to the printable substrate 114 can be about 90% by weight to about 100% by weight of the ink image, such as 95% by weight to about 100% by weight.

In an embodiment, the temperature of the ink is maintained about room temperature during both ink take up onto the anilox roller and ink transfer at the transfer nip. This is because increasing the ink temperature can cause the water to evaporate and undesirably dry/harden the ink during processing. Thus, in an embodiment, the ink take up and transfer temperatures are both about 25° C. In other embodiments, the temperature of the ink can be either raised or lowered in any manner suitable for the printing process.

Subsequent to transfer of the ink image to the printable substrate 114, an optional final cure can be performed. The final cure of the ink image on printable substrate 114 can be accomplished by any suitable method, such as by exposure of the ink image to ultraviolet light and/or heat. In an embodiment of the present disclosure, the ink image is exposed to ultraviolet light to cure the ink image subsequent to the transferring, with little or no heating of the ink image for drying. Drying can be omitted because it has been found that the inks of the present disclosure can be effectively cured and provide a robust ink image without the need to remove water. In an example, the ink image is not heated above 60° C. between the transferring and the exposure of the ink image to ultraviolet light. Thus, the ink may remain at a temperature of from about 20° C. to about 60° C., or about 20° C. to about 40° C., or about 20° C. to about 30° C., from the time the ink image is transferred to the printable substrate 114 until the UV cure process is complete.

In certain offset lithographic systems, an offset roller, not shown in FIG. 1, may first receive the ink image pattern from the imaging member 110 and then transfer the ink image pattern to the printable substrate 114, according to a indirect transfer method. Such offset rollers and indirect transfer techniques are well known in the art.

Following the transfer of the majority of the ink to the printable substrate 114, any residual ink and/or residual dampening fluid may be removed from the reimageable surface of the imaging member 110, preferably without scraping or significantly wearing that surface. An air knife (not shown) may be employed to remove residual dampening fluid. It is anticipated, however, that some amount of ink residue may remain. Removal of such remaining ink residue may be accomplished through use of some form of cleaning subsystem 170. In an embodiment, the cleaning subsystem 170 comprises at least a first cleaning member such as a sticky or tacky member in physical contact with the reimageable surface of the imaging member 110, the sticky or tacky member removing residual ink and any remaining small amounts of surfactant compounds from the dampening fluid of the reimageable surface of the imaging member 110. The sticky or tacky member may then be brought into contact with a smooth roller to which residual ink may be transferred from the sticky or tacky member, the ink being subsequently stripped from the smooth roller by, for example, and a doctor blade.

Any other suitable mechanisms can be employed by which cleaning of the reimageable surface of the imaging member 110 may be facilitated. Cleaning of the residual ink and dampening fluid from the reimageable surface of the imaging member 110 can reduce or prevent the formation of ghost images (also known as "ghosting") in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

EXAMPLE

Example 1: Highly Sulfonated Polyester Synthesis (7.5 wt % Sulfonation)

A 5 gallon Parr reactor equipped with a mechanical stirrer, distillation apparatus and bottom drain valve was charged with Dimethyl Terephthalate (3.492 Kg), Dimethyl-5-Sulfoisophthalate sodium salt (940 g), 1,2-Propanediol (2.9 Kg), Diethylene glycol (449 g) and FASCAT 4100 (7.2 g). The mixture was heated under nitrogen flow (3 SCFH) to 120° C., after which stirring at 50 rpm was initiated. The mixture was then heated at 0.5° C./min for the next two hours until a temperature of 180° C. was attained, during which the methanol byproduct was collected in the distillation receiver. The mixture was then heated at a rate of 0.25° C., until a temperature of 210° C. was attained, during which both methanol and excess 1,2-propanediol was collected in the distillation receiver. Vacuum was then applied gradually until 4.4 mm-Hg was attained at 210° C. over a 1 hour period. The mixture was then re-pressurized to atmospheric pressure with nitrogen, and the content was discharged through the bottom drain into a container. The product was then allowed to cool to room temperature overnight, followed by granulation using a fitz-mill. The product, displayed an onset glass transition temperature of about 55.4° C., number average molecular weight of about 1,326 g/mole, a weight average molecular weight of about 2,350 g/mole, and a softening point of about 135.9° C.

Examples 2 to 4: Formulation into DALI Ink

TABLE 1

Ink Compositions

| | Magenta Comparative Example A | | Cyan Example 2 | | Yellow Example 3 | | Black Example 4 | |
|---|---|---|---|---|---|---|---|---|
| | wt % | mass (g) | wt % | mass (g) | wt % | mass (g) | wt % | mass (g) |
| Water | 20.0% | 14 | 20.0% | 14 | 20.0% | 14 | 20.0% | 14 |
| Xfast Blue 7080 | 0.0% | 0 | 12.5% | 8.75 | 0.0% | 0 | 0.0% | 0 |
| Xfast Magenta 4790 | 12.5% | 8.75 | 0.0% | 0 | 0.0% | 0 | 0.0% | 0 |
| Xfast Yellow 0962 | 0.0% | 0 | 0.0% | 0 | 12.5% | 8.75 | 0.0% | 0 |
| Xfast Black 0066 | 0.0% | 0 | 0.0% | 0 | 0.0% | 0 | 12.5% | 8.75 |
| SPE of Example 1 | 27.5% | 19.25 | 30.0% | 21 | 27.5% | 19.25 | 27.5% | 19.25 |
| SR610 (PEG 600 DA) | 15.0% | 10.5 | 5.0% | 3.5 | 7.5% | 5.25 | 7.5% | 5.25 |
| SR9035 (TMPTA) | 15.0% | 10.5 | 0.0% | 0 | 0.0% | 0 | 0.0% | 0 |
| Solmer U 560 | 0.0% | 0 | 12.5% | 8.75 | 10.0% | 7 | 10.0% | 7 |
| Solmer SWA8006W20 | 0.0% | 0 | 10.0% | 7 | 12.5% | 8.75 | 12.5% | 8.75 |
| Irgacure 819 DW | 10.0% | 7 | 10.0% | 7 | 10.0% | 7 | 10.0% | 7 |
| TOTAL | 100.0% | 70.0 | 100.0% | 70.0 | 100.0% | 70.0 | 100.0% | 70.0 |

Figure 2:
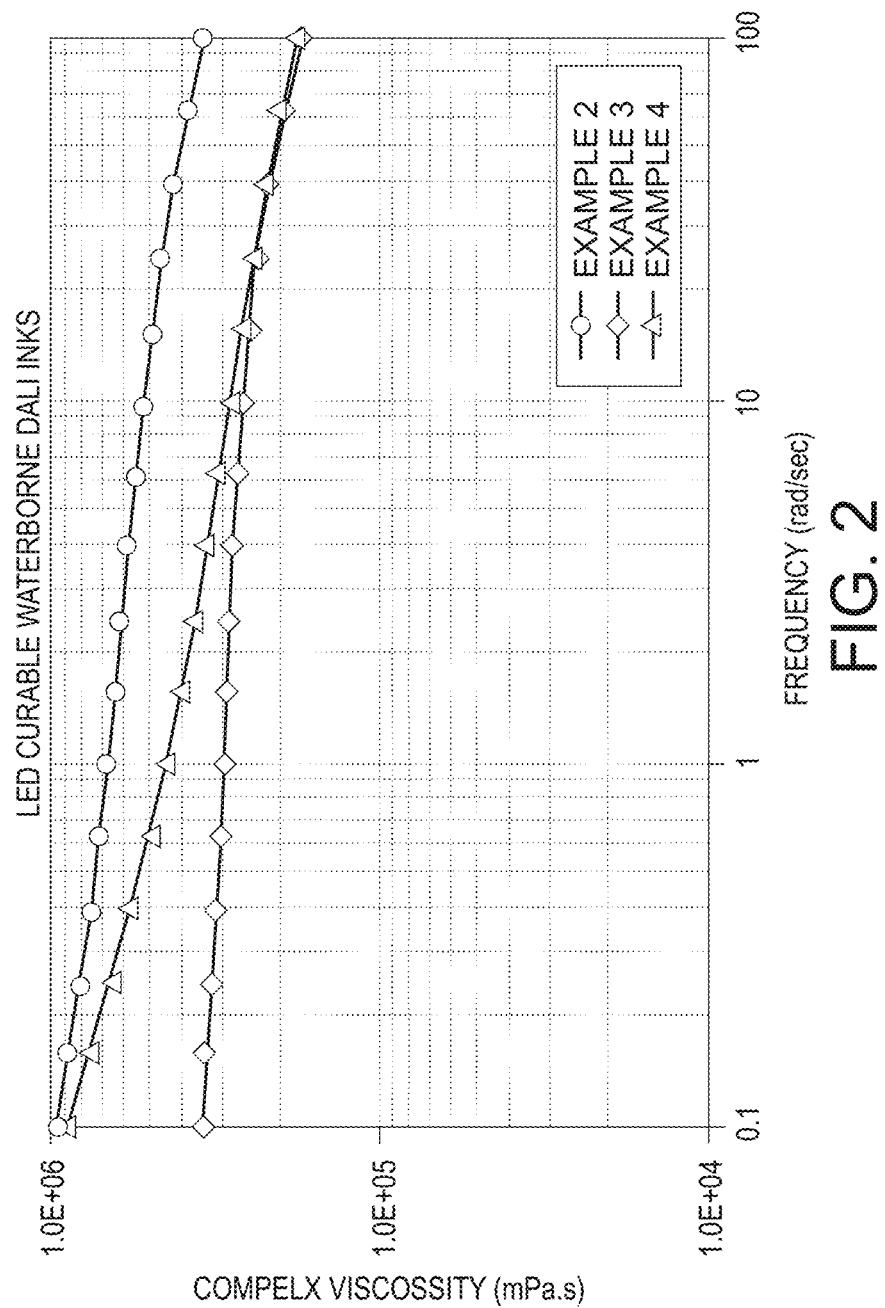
FIG. 2 shows a log-log graph of complex viscosity of ink samples, according to examples of the present disclosure.

To a 150 mL beaker fitted with a heating jacket and overhead mixer was added water and SR610. The solution was then sheared with a Cowles blade at 600 rpm and to the beaker was added a dry XFast pigment. Once the XFast pigment had been completely dispersed (~15 min), sulfopolyester ("SPE") of Example 1 was then gradually added into the dispersion with continued shearing. After the addition of the sulfopolyester, the mixture was brought to 85-90° C. for 10-15 minutes or until the polymer was completely dispersed. The mixture was cooled to ~60° C. and then Solmer U 560 and Solmer SWA8006W20 were added and stirred for an additional 10 minutes. The heat and mixer were reduced to <50° C. and 300 rpm respectively. Finally, Irgacure 819 DW was added dropwise to the stirring mixture, which was allowed to mix for an additional 10-15 minutes to furnish the finished ink. This procedure was followed for each of the inks of Examples 3 to 5. The complex viscosity of the ink samples was measured at 25° C. using a DHR-2 rheometer from TA Instruments and the data is shown in FIG. 2.

Example 5: Transfer Efficiency Testing of Inks Containing Polyurethane on Lithographic Print Fixture Examples 2, 3 and 4 were tested in a DALI surrogate print testing fixture (referred to here as 'Mimico') to evaluate the efficiency of ink transfer from the blanket under typical lithographic print conditions. An anilox roll was filled with ink, transferred to the blanket, then offset pressed onto Sterling Gloss #80 paper, followed by a second and third offset event between fresh paper and the previously inked blanket to monitor the residual ink that may remain on the blanket ('chase sheet'). Prints were then cured using LED lamps at 395 nm and 365 nm or combination of both LED lamps. The prints were cured at a speed of 0.1 and 0.5 m/s.

Figure 3:
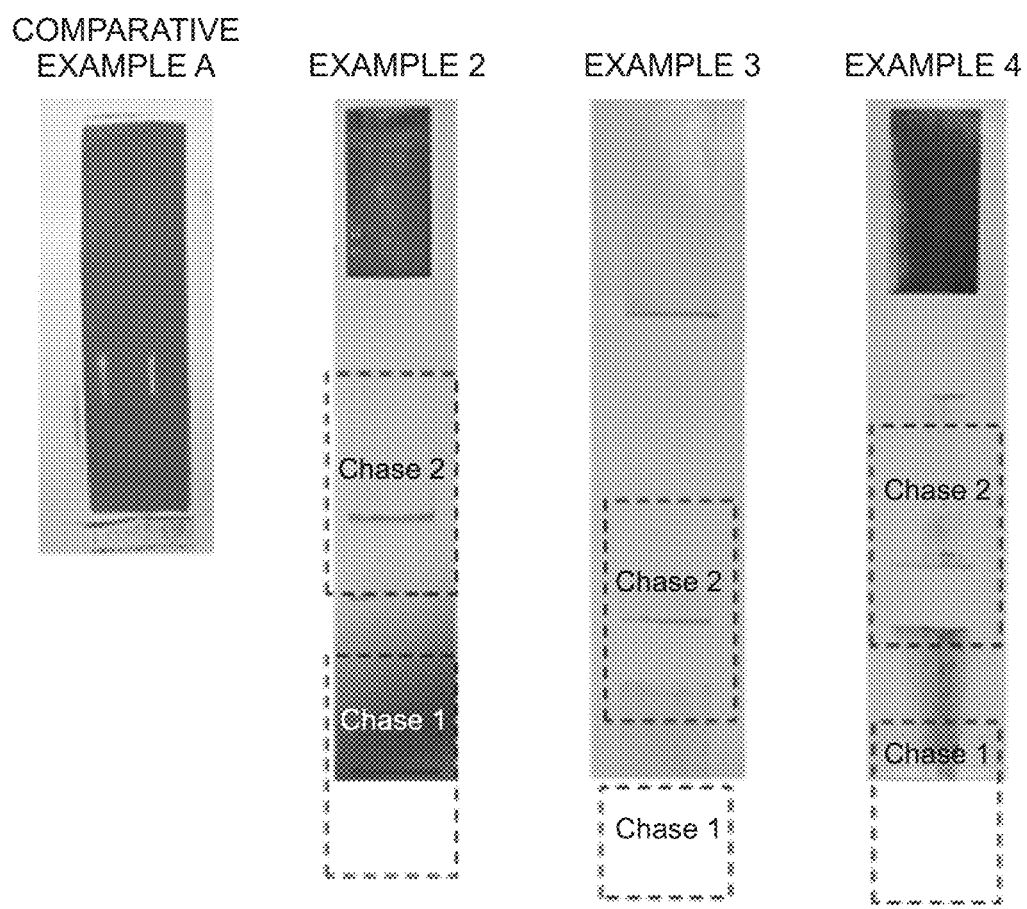
FIG. 3 shows ink transfer test results for offset printing example inks of the present disclosure.

Comparative Example A was tested by hand rolling the ink onto a blanket and then applying pressure to a sheet of Sterling Gloss #80 paper on top of the blanket. The results of testing are shown in FIG. 3. However, it is noted that the ink of Comparative Example A was too thin to be printed properly on the DALI fixture and the ink split instead of having >90-95% transfer (due to low viscosity and tack).

Thus, it was determined that the Comparative Example A, without a urethane acrylate oligomer, was not a viable option for DALI technology, FIG. 3 shows the offset printing results for the 4 ink samples. Examples 2 and 3 showed good ink transfer with low residue ink observed on the 'chase' sheet. There is a greater residue on the chase of Example 3, however this is an early experiment and by increasing the tack of the ink the transfer should increase as well.

Example 6: Robustness Testing

Dried prints of the inks of Examples 2, 3 and 4 and Comparative Example A were coated on paper and were subjected to preliminary robustness testing, including tape testing, water swab testing, and isopropyl alcohol (IPA) testing. The results are summarized in Table 2 and as described below:

Prints were robust to tape test, where scotch tape was applied with pressure to the print surface and removed cleanly Prints were robust to a water swab test, where a cotton swab was dipped in water and rubbed with pressure across the print surface until the paper could be seen (down and up is one double rub). The results of the test are shown in Table 2. Results were recorded at T=0 as well as T=1 (24 hours).

Prints were robust to an IPA swab test, where a cotton swab was dipped in IPA and rubbed with pressure across the print surface until the paper could be seen (down and up is one double rub). The results of the test are shown in Table 2. Results were recorded at T=0 as well as T=1 (24 hours).

To check whether the water had to be removed from the film before curing, prints were dried with a heat gun prior to exposure to UV radiation. This had a very minimal to no-effect on the robustness properties. Waterborne inks typically require removal of any remaining water before exposure to UV radiation. The ability to 'wet-cure' aqueous UV curable inks is an unexpected benefit.

TABLE 2

Water and IPA rub resistance data for
LED-curable waterborne DALI inks.

| Ink Sample | Ink Colour | Lamp 395 nm | Lamp 365 nm | Cure Speed (m/s) | T = 0, Double Rubs Water | T = 0, Double Rubs IPA | T = 1, Double Rubs Water | T = 1, Double Rubs IPA |
|---|---|---|---|---|---|---|---|---|
| Comparative Example A | Magenta | Y | | 0.1 | 24 | 16 | 26 | 20 |
| Comparative Example A | Magenta | Y | Y | 0.1 | 38 | 22 | 43 | 32 |
| Example 2 | Cyan | Y | | 0.1 | 150 | 80 | 140 | 87 |
| Example 2 | Cyan | Y | | 0.5 | 40 | 15 | 40 | 22 |
| Example 3 | Yellow | Y | | 0.1 | >150 | >120 | >150 | >120 |
| Example 3 | Yellow | Y | | 0.5 | 92 | 42 | 132 | 72 |
| Example 4 | Black | Y | | 0.1 | 42 | 17 | 85 | 34 |
| Example 4 | Black | Y | | 0.5 | 4 | 3 | 3 | 6 |

Examples 7 to 10: DALI Ink Formulations

TABLE 3

Ink Compositions of Examples 7 to 10

| | Cyan Example 7 | | Magenta Example 8 | | Yellow Example 9 | | Black Example 10 | |
|---|---|---|---|---|---|---|---|---|
| | wt % | mass (g) | wt % | mass (g) | wt % | mass (g) | wt % | mass (g) |
| Water | 24.0% | 16.8 | 24.0% | 16.8 | 23.0% | 16.1 | 24.0% | 16.8 |
| Xfast Blue 7080 | 12.5% | 8.75 | 0.0% | 0 | 0.0% | 0 | 0.0% | 0 |
| Xfast Magenta 4790 | 0.0% | 0 | 12.5% | 8.75 | 0.0% | 0 | 0.0% | 0 |
| Xfast Black 0066 | 0.0% | 0 | 0.0% | 0 | 0.0% | 0 | 12.5% | 8.75 |
| Xfast Yellow 0962 | 0.0% | 0 | 0.0% | 0 | 13.5% | 9.45 | 0.0% | 0 |
| SPE | 27.5% | 19.25 | 27.5% | 19.25 | 27.5% | 19.25 | 27.5% | 19.25 |
| Dynwet 800 | 1.0% | 0.7 | 1.0% | 0.7 | 1.0% | 0.7 | 1.0% | 0.7 |
| SR9035 (EO-TMPTA) | 7.5% | 5.25 | 7.5% | 5.25 | 7.5% | 5.25 | 7.5% | 5.25 |
| Solmer U 560 | 10.0% | 7 | 10.0% | 7 | 10.0% | 7 | 10.0% | 7 |
| Solmer SWA8006W20 | 12.5% | 8.75 | 12.5% | 8.75 | 12.5% | 8.75 | 12.5% | 8.75 |
| Irgacure 819 DW | 2.0% | 1.4 | 2.0% | 1.4 | 5.0% | 3.5 | 5.0% | 3.5 |
| TPO-L | 3.0% | 2.1 | 3.0% | 2.1 | 0.0% | 0 | 0.0% | 0 |
| TOTAL | 100.0% | 70.0 | 100.0% | 70.0 | 100.0% | 70.0 | 100.0% | 70.0 |

The compositions of Examples 7 to 10 were prepared as follows. To a 150 mL beaker fitted with a heating jacket and overhead mixer was added water, Dynwet 800 and SR9035. The solution was then sheared with a Cowles blade at 600 rpm and to the beaker was added a dry XFast pigment. Once the XFast pigment had been completely dispersed (~15 min), sulfopolyester ("SPE") of Example 1 was then gradually added into the dispersion with continued shearing. After the addition of the sulfopolyester, the mixture was brought to 85-90° C. for 10-15 minutes or until the polymer was completely dispersed. The mixture was cooled to ~60° C. and then Solmer U 560 and Solmer SWA8006W20 were added and stirred for an additional 10 minutes. The heat and mixer were reduced to <50° C. and 300 rpm respectively. Finally, Irgacure 819 DW was added dropwise to the stirring mixture, which was allowed to mix for an additional 10-15 minutes to furnish the finished ink. This procedure was followed for each of the inks of Examples 7 to 10.

Example 11: Robustness Testing for Ink Compositions 8 to 11

Dried prints of the inks of Examples 7, 8, 9 and 10 were coated on paper and were subjected to preliminary robustness testing, including water swab testing and isopropyl alcohol (IPA) testing. The results are summarized in Table 4 and as described below:

Prints were robust to a water swab test, where a cotton swab was dipped in water and rubbed with pressure across the print surface until the paper could be seen (down and up was one double rub). The results of the test are shown in Table 4. Results were recorded at T=0 as well as T=1 (24 hours).

Prints were robust to an IPA swab test, where a cotton swab was dipped in IPA and rubbed with pressure across the print surface until the paper could be seen (down and up was one double rub). The results of the test are shown in Table 4. Results were recorded at T=0 as well as T=1 (24 hours).

TABLE 4

| Ink Sample | Ink Colour | 395 nm Lamp Cure Speed (m/s) | T = 0, Double Rubs Water | T = 0, Double Rubs IPA | T = 1, Double Rubs Water | T = 1, Double Rubs IPA | Notes |
|---|---|---|---|---|---|---|---|
| Example 7 | Cyan | 0.1 | 125 | 106 | 130 | 120 | 2% 819 DW, 3% TPO-L |
| Example 7 | Cyan | 0.5 | 56 | 31 | 65 | 33 | 2% 819 DW, 3% TPO-L |
| Example 9 | Yellow | 0.1 | >150 | >120 | >150 | >120 | 5% 819 DW |
| Example 9 | Yellow | 0.5 | 92 | 42 | 132 | 72 | 5% 819 DW |
| Example 10 | Black | 0.1 | 36 | 50 | 45 | 60 | 5% 819 DW |

TABLE 4-continued

| Ink Sample | Ink Colour | 395 nm Lamp Cure Speed (m/s) | T = 0, Double Rubs Water | IPA | T = 1, Double Rubs Water | IPA | Notes |
|---|---|---|---|---|---|---|---|
| Example 10 | Black | 0.5 | 4 | 14 | 5 | 14 | 5% 819 DW |
| Example 8 | Magenta | 0.1 | 110 | >150 | >150 | >150 | 3% 819 DW, 2% TPO-L |
| Example 8 | Magenta | 0.5 | 90 | 68 | 95 | 110 | 3% 819 DW, 2% TPO-L |

Example 12: Transfer Efficiency Testing of Inks Containing Polyurethane on Lithographic Print Fixture Examples 7, 8, 9 and 10 were tested in a DALI surrogate print testing fixture (referred to here as 'Mimico') to evaluate the efficiency of ink transfer from the blanket under typical lithographic print conditions. An anilox roll was filled with ink, transferred to the blanket, then offset pressed onto Sterling Gloss #80 paper, followed by a second and third offset event between fresh paper and the previously inked blanket to monitor the residual ink that may remain on the blanket ('chase sheet'). Prints were then cured using LED lamps at 395 nm or 365 nm or combination of both LED lamps. The prints were cured at a speed of 0.1 and 0.5 m/s.

Figure 4:
FIG. 4 shows ink transfer test results for offset printing example inks of the present disclosure.

The results of testing are shown in FIG. 4. Examples 7, 8, 9 and 10 showed good ink transfer with low residue ink observed on the 'chase' sheet.

In summary, the example waterborne DALI ink compositions comprised of highly sulfonated polyester resin (7.5%) and waterborne UV-curable aliphatic urethane acrylates exhibited good robustness, including high chemical, water and scratch resistance, without the need for removal of excess water in the film prior to UV curing. The ink formulations are considered suitable for expanded market applications such as food labels and packaging due to low migration of curable components, without the need to alter the current DALI printing apparatus. The ability to cure the aqueous inks with UV light without the need for complete drying off of the water is unexpected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompass by the following claims.

What is claimed is:

1. An ink composition, comprising:
   at least one sulfonated polyester;
   at least one (meth)acrylate monomer;
   at least two urethane acrylate oligomers having a weight average molecular weight ranging from 2000 to about 5000;
   at least one photoinitiator;
   at least one colorant; and
   water.

2. The composition of claim 1, wherein the sulfonated polyester has a degree of sulfonation of from about 3 mole percent to about 15 mole percent.

3. The composition of claim 1, wherein the sulfonated polyester comprises a polymer unit of formula I, a polymer unit of formula II and a crosslinker unit having the following structures:

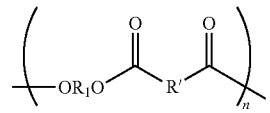

Formula I

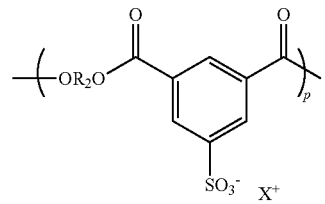

Formula II

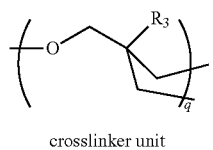

crosslinker unit wherein:
each $R_1$ and each $R_2$ is independently an alkylene of from 2 to about 25 carbon atoms;
each $R_3$ is independently a branched or unbranched alkyl group of from 1 to 15 carbon atoms;
each R' is independently an arylene of from about 6 to about 36 carbon atoms;
each $X^+$ is independently $Na^+$, Li+, or K+;
n is from about 80 to about 95 mole percent;
p is from about 5 to about 15 mole percent; and
q is from about 0.1 to about 4 mole percent.

4. The composition of claim 1, wherein the sulfonated polyester is present in the ink composition in an amount of from about 10 to about 60 percent by weight based upon the total weight of the ink composition.

5. The composition of claim 1, wherein the at least one (meth)acrylate monomer is UV curable and comprises at least one monomer selected from the group consisting of difunctional (meth)acrylates and multifunctional (meth)acrylates.

6. The composition of claim 1, wherein the at least one (meth)acrylate monomer is selected from the group consisting of alkyl acrylates and alkoxy acrylates.

7. The composition of claim 1, wherein the at least one (meth)acrylate monomer is selected from the group consisting of ethoxylated acrylates, propoxylated acrylates, trimethylpropane triacrylate, ethoxylated trimethylpropane triacrylate and propoxylated trimethylpropane triacrylate.

8. The composition of claim 1, wherein the at least two urethane acrylate oligomers include a trifunctional urethane acrylate oligomer and a multifunctional urethane acrylate oligomer having a functionality of 4 to 8.

9. The composition of claim 1, wherein the at least two urethane acrylate oligomers comprise a first urethane acrylate oligomer and a second urethane acrylate oligomer, the first urethane acrylate oligomer having a first viscosity at 60° C. and the second urethane acrylate oligomer having a second viscosity at 60° C., the first viscosity being lower than the second viscosity.

10. The composition of claim 9, wherein the first viscosity ranges from 1000 cP to about 5500 cP at 60° C. and the second viscosity ranging from about 6000 cP to about 20,000 cP at 60° C.

11. The composition of claim 1, wherein the second at least two urethane acrylate oligomers have a weight average molecular weight ranging from about 3000 to about 5000.

12. The composition of claim 1, wherein the at least one photoinitiator is selected from the group consisting of phosphine oxide photoinitiators.

13. The composition of claim 1, wherein the at least one colorant is a pigment.

14. The composition of claim 1, further comprising a latex.

15. The composition of claim 14, wherein the latex is a polyurethane dispersion that is present in the ink composition in an amount of from about 2 to about 40 percent by weight based upon the total weight of the ink composition.

16. The composition of claim 1, wherein water is present in the ink composition in an amount of from about 10 to about 30 percent by weight based upon the total weight of the ink composition.

17. The composition of claim 1, wherein the ink composition has a complex viscosity ranging from about 100,000 centipoise to about 2,000,000 centipoise at a temperature of 25° C. and an angular frequency of 1 rad/s.

18. A method for variable lithographic printing, comprising:
applying a dampening fluid to an imaging member surface;
forming a latent image by removing the dampening fluid from selective locations on the imaging member surface to form hydrophobic non-image areas and hydrophilic image areas;
developing the latent image by applying an ink composition to the hydrophilic image areas, thereby forming an ink image; and
transferring the ink image to a printable substrate,
the ink composition comprising:
at least one sulfonated polyester;
at least one (meth)acrylate monomer;
at least two urethane acrylate oligomers having a weight average molecular weight ranging from 2000 to about 5000;
at least one photoinitiator;
at least one colorant; and
water.

19. The method of claim 18, further comprising exposing the ink image to ultraviolet light to cure the ink image subsequent to the transferring, wherein the ink image is not heated above 60° C. between the transferring and the exposing.

20. The method of claim 18, wherein the printable substrate is a food label.

* * * * *